No. 835,266. PATENTED NOV. 6, 1906.
P. T. TKATZSCHENKO.
BOTTLE.
APPLICATION FILED OCT. 23, 1905.
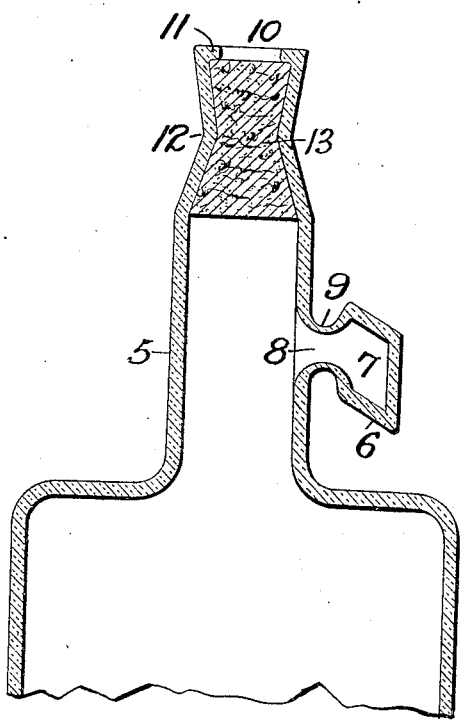
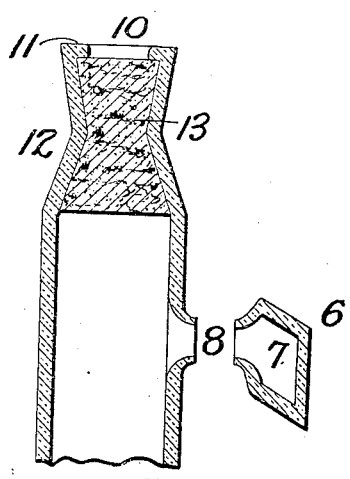
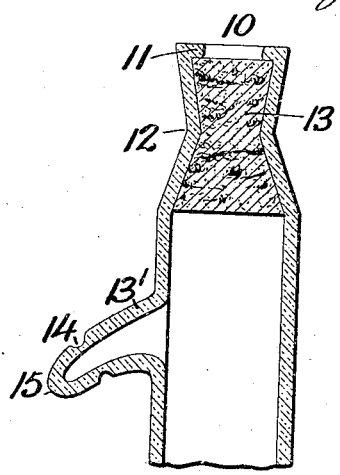
Witnesses
Max B. A. Doring
Harry C. Hibig
Inventor,
Peter T. Tkatzschenko
By his Attorney
James F. Duhamel.

UNITED STATES PATENT OFFICE.

PETER THEODOR TKATZSCHENKO, OF NEW YORK, N. Y.

BOTTLE.

No. 835,266.  Specification of Letters Patent.  Patented Nov. 6, 1906.

Application filed October 23, 1905. Serial No. 283,899.

*To all whom it may concern:*

Be it known that I, PETER THEODOR TKATZSCHENKO, a subject of the Emperor of Russia, residing at Brooklyn, Kings county, New York city, New York, have invented certain new and useful Improvements in Bottles, of which the following is a specification.

My invention relates to improvements in bottles, and has for its special object to provide bottles which must be partially destroyed before the contents of same may be poured out, so that it will be impossible to use the bottle again in the trade without disclosure of previous use. The bottle is particularly well adapted for domestic use and when the entire contents are to be used at once.

These and other details and objects are more fully described in the following specification and set forth in the appended claims.

In the drawings accompanying this specification, and forming a part thereof, like reference characters are used to designate like parts.

Figure 1 is a vertical sectional view of the upper part of a bottle which embodies my invention. Fig. 2 is a similar view with a part of the bottle broken off to illustrate the function of said part. Fig. 3 is a vertical sectional view of the neck of a bottle, showing a modified form of my invention.

On the neck 5 of a bottle of ordinary construction I form a substantially lateral projection 6, inclosing a cavity 7, which communicates with the neck of the bottle through the opening 8. The walls of the projection are of a thickness about equal to the neck of the bottle, but the connecting part 9 at the opening 8 is reduced in thickness and width to render it more delicate in structure and more liable to fracture.

The mouth 10 of the bottle is provided with a rim or flange 11, projecting inwardly in a horizontal plane, and the neck is contracted at 12. When the bottle is filled with liquid, the cork 13 is forced in below the shoulder 11, and on relaxing after the pressure is removed its upper portion spreads out beneath said shoulder and secures it against ready extraction. The cork thus becomes practically a permanent part of the bottle.

To afford an outlet for and remove the contents of the bottle, the projection 6 is broken off, as shown in Fig. 2, and the liquid can then be poured out of the opening 8 for consumption. The bottle is thus practically destroyed, and if filled again there is no guarantee that what it now contains is the same brand and quality of liquid originally contained in the bottle and the consumer is protected against misrepresentation and fraud. This form of bottle is preferably adapted to household use or where the liquid contained in it is intended to be wholly consumed when the bottle has been opened, but not so desirable when consumed in small quantities at a time.

A modified form of the bottle is illustrated in Fig. 3, in which modification the projection 13' is practically a closed spout with a circumferential groove 14 near its end. When about to be used, the head 15 is broken off and an opening thus made for the emptying of the bottle.

If it is desired to retain the contents or part of same in the bottle after it has been opened by the breaking off of these projections, the opening may be closed by a cork inserted therein.

What I claim as new, and desire to secure by Letters Patent, is—

1. A bottle adapted to be partially destroyed when the contents are to be poured out whereby its previous use is apparent comprising a neck tapering inwardly at the top portion and again outwardly whereby it is contracted in the center of said top portion and having a flange at its mouth projecting inwardly, and a hollow lateral projection below on the neck having a contracted portion whereby it is rendered fragile.

2. In a bottle of the class described a neck tapering inwardly at the top portion and again outwardly whereby it is contracted in the center of said top portion and having a flange at its mouth projecting inwardly, and a hollow lateral projection below on the neck having a contracted portion near the neck which is made thinner in glass to render it very fragile.

In testimony whereof I have signed my name to this specification, in the presence of two subscribing witnesses, this 11th day of October, 1905.

PETER THEODOR TKATZSCHENKO.

Witnesses:
 H. G. HOSE,
 JAMES F. DUHAMEL.